F. KETCHUM.
Sheep Trough.
No. 70,859. Patented Nov. 12, 1867.
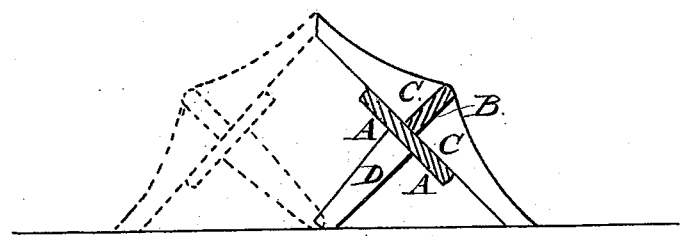
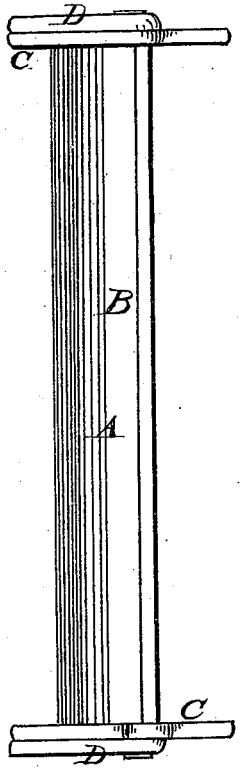

United States Patent Office.

FRANK KETCHAM, OF MONONGAHELA CITY, PENNSYLVANIA.

Letters Patent No. 70,859, dated November 12, 1867.

IMPROVEMENT IN SHEEP-TROUGH.

*The Schedule referred to in these Letters Patent and making part of the same.*

TO ALL WHOM IT MAY CONCERN.

Be it known that I, FRANK KETCHAM, of Monongahela City, in the county of Washington, and State of Pennsylvania, have invented a new and improved Sheep-Trough; and I do hereby declare that the following is a full, clear, and exact description thereof, which will enable those skilled in the art to make and use the same, reference being had to the accompanying drawings, forming part of this specification.

This invention relates to an improved sheep-trough, and consists in a reversible trough so constructed that one trough is always dry and clean. In the accompanying drawings—

Figure 1 is a top view of my improved trough, and

Figure 2 is a transverse section thereof, the same section being also shown in red ink with trough reversed.

Similar letters of reference indicate corresponding parts.

The trough is made of a long, flat piece of wood or other suitable material A, having cross-pieces C fastened on each end, forming the ends of the trough, each end of C serving alternately as a leg, according to the trough intended to be used. A longitudinal piece, B, of same material, and one-half the depth of A, is fastened upon it at right angles extending from end to end, making a T-shape with A, and completing the trough. A leg, D, is fastened at each end, at right angles to the plane of A, on the opposite side to B.

Supposing the part before in use to be wet or dirty, by reversing the position a clean and dry trough is provided in which the food can be placed, while the dirt will fall out from the first, which will become clean and dry by the time the trough now in use requires cleaning.

I claim as new, and desire to secure by Letters Patent—

The sheep-trough, of the form and configuration substantially as and for the purposes herein shown and described.

FRANK KETCHAM.

Witnesses:
CICERO McCLURE,
WILLIAM DEWALT.